US012363477B2

(12) United States Patent
Kim et al.

(10) Patent No.: US 12,363,477 B2
(45) Date of Patent: Jul. 15, 2025

(54) METHOD AND DEVICE FOR CONTROLLING MICROPHONE INPUT/OUTPUT BY WIRELESS AUDIO DEVICE DURING MULTI-RECORDING IN ELECTRONIC DEVICE

(71) Applicant: SAMSUNG ELECTRONICS CO., LTD., Suwon-si (KR)

(72) Inventors: Jeonghwan Kim, Suwon-si (KR); Daesun Rhee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 273 days.

(21) Appl. No.: 18/137,109

(22) Filed: Apr. 20, 2023

(65) Prior Publication Data

US 2023/0262386 A1 Aug. 17, 2023

Related U.S. Application Data

(63) Continuation of application No. PCT/KR2021/016457, filed on Nov. 11, 2021.

(30) Foreign Application Priority Data

Nov. 11, 2020 (KR) ........................ 10-2020-0150062

(51) Int. Cl.

| | |
|---|---|
| ***H04R 3/00*** | (2006.01) |
| ***G10L 25/78*** | (2013.01) |
| ***H04R 1/40*** | (2006.01) |

(52) U.S. Cl.

CPC .............. *H04R 3/005* (2013.01); *G10L 25/78* (2013.01); *H04R 1/406* (2013.01); *H04R 2410/01* (2013.01); *H04R 2420/07* (2013.01)

(58) Field of Classification Search

CPC .... H04R 3/005; H04R 1/406; H04R 2410/01; H04R 2420/07; G10L 25/78

(Continued)

(56) References Cited

U.S. PATENT DOCUMENTS

| | | | | |
|---|---|---|---|---|
| 9,820,041 | B2 * | 11/2017 | Kum ...................... | H04R 3/005 |
| 10,051,099 | B2 | 8/2018 | Lu et al. | |

(Continued)

FOREIGN PATENT DOCUMENTS

| | | | |
|---|---|---|---|
| JP | 2019-62317 | A | 4/2019 |
| KR | 10-2008-0038038 | A | 5/2008 |

(Continued)

OTHER PUBLICATIONS

International Search Report (PCT/ISA/210) issued by the International Searching Authority on Feb. 18, 2022 in International Patent Application No. PCT/KR2021/016457.

(Continued)

*Primary Examiner* — William A Jerez Lora
(74) *Attorney, Agent, or Firm* — Sughrue Mion, PLLC

(57) ABSTRACT

A wireless audio device includes a communication module, a plurality of microphones comprising an internal microphone and an external microphone, and at least one processor configured to: receive a multi-recording conversion signal from an electronic device, enable at least one microphone of the internal microphone and the external microphone based on the multi-recording conversion signal, transmit a first audio signal generated based on a sound input through the enabled at least one microphone to the electronic device, detect a microphone control input, selectively mute or unmute the at least one microphone of the internal microphone and the external microphone based on the microphone control input, and transmit, to the electronic device, a second audio signal generated based on a micro- (Continued)

phone input acquired in a state where the at least one microphone of the internal microphone and the external microphone is selectively muted or unmuted based on the microphone control input.

20 Claims, 9 Drawing Sheets

(58) Field of Classification Search
USPC ................................ 381/56, 58, 91, 92, 311
See application file for complete search history.

(56) References Cited

U.S. PATENT DOCUMENTS

| | | | | |
|---|---|---|---|---|
| 11,120,818 | B2 * | 9/2021 | Magnusson | H04N 9/806 |
| 2002/0012050 | A1 | 1/2002 | Oka et al. | |
| 2008/0101625 | A1 | 5/2008 | Fazzio et al. | |
| 2008/0201138 | A1 | 8/2008 | Visser et al. | |
| 2012/0128166 | A1 | 5/2012 | Kim et al. | |
| 2013/0156198 | A1 * | 6/2013 | Kim | G01S 3/808 381/17 |
| 2013/0226593 | A1 * | 8/2013 | Magnusson | H03G 1/02 704/276 |
| 2013/0293662 | A1 | 11/2013 | Moran et al. | |
| 2014/0056439 | A1 | 2/2014 | Kim | |
| 2014/0242964 | A1 | 8/2014 | Seo et al. | |
| 2016/0066091 | A1 * | 3/2016 | Kum | H04R 3/005 381/92 |
| 2018/0262747 | A1 | 9/2018 | Meirlaen | |
| 2018/0279048 | A1 | 9/2018 | Mattana | |
| 2020/0186926 | A1 | 6/2020 | Park et al. | |
| 2020/0219525 | A1 | 7/2020 | Moon et al. | |
| 2020/0245056 | A1 | 7/2020 | Boetcher et al. | |

FOREIGN PATENT DOCUMENTS

| | | | |
|---|---|---|---|
| KR | 10-1547035 | B1 | 8/2015 |
| KR | 10-2017-0030366 | A | 3/2017 |
| KR | 10-2017-0115480 | A | 10/2017 |
| KR | 10-1903374 | B1 | 11/2018 |
| KR | 10-2019-0028043 | A | 3/2019 |
| KR | 10-1968920 | B1 | 4/2019 |
| KR | 10-2049781 | B1 | 11/2019 |
| KR | 10-2020-0085030 | A | 7/2020 |

OTHER PUBLICATIONS

Written Opinion (PCT/ISA/237) issued by the International Searching Authority on Feb. 18, 2022 in International Patent Application No. PCT/KR2021/016457.

* cited by examiner

METHOD AND DEVICE FOR CONTROLLING MICROPHONE INPUT/OUTPUT BY WIRELESS AUDIO DEVICE DURING MULTI-RECORDING IN ELECTRONIC DEVICE

CROSS-REFERENCE TO RELATED APPLICATIONS

This application is a bypass continuation application of International Application No. PCT/KR2021/016457, filed on Nov. 11, 2021, which is based on and claims priority to Korean Patent Application No. 10-2020-0150062, filed on Nov. 11, 2020, in the Korean Intellectual Property Office, the disclosures of which are incorporated by reference herein in their entireties.

BACKGROUND

1. Field

The disclosure relates to a method and a device for controlling a microphone input/output in a wireless audio device during multi-recording in an electronic device.

2. Description of Related Art

Recent technological advances have enabled the development and release of various wearable devices in association with electronic devices. By way of example, in case of audio input and output devices, the use of wireless devices (e.g., a wireless earbud or a true wireless stereo (TWS) device) using a wireless connection scheme has been increased.

An electronic device may provide a recording function using a camera and/or microphone. In accordance with development in performance of a camera mounted in an electronic device, the number of users photographing an image with a camera of an electronic device has been increased.

A user may perform a recording function (e.g., video recording or audio recording) using a camera and/or a microphone in various environments. A photographer may photograph a subject (or speaker) by using a camera of an electronic device. However, it may be difficult to acquire an audio of the subject depending on a distance between an utterance point (e.g., a speaker's mouth) of the subject (or the speaker) and a microphone mounted in the electronic device.

In order to collect a voice of a subject, an electronic device may use a wireless wearable device (e.g., a TWS device) worn by the subject to perform recording. However, in case of a wearable device, since an external microphone exposed to the outside is used, and not only the voice of the subject but also external noise is recorded, the voice of the subject may not be correctly recorded. In addition, since microphones are always enabled regardless of an utterance of the subject or an utterance of the photographer, a voice may be acquired without considering a recording situation.

Further, in case of changing a photographing direction (e.g., selfie photographing), the electronic device may provide image inversion or non-inversion functions, but a direction of a left channel and a right channel is not changed, and thus a signal input when acquiring the subject's voice may have conflicting left and right outputs in terms of audio and video.

SUMMARY

According to various embodiments, in case of performing multi-recording for recording an audio and/or recording a video by using a wireless audio device and an electronic device, an electronic device may select a device for collecting an audio signal (or audio data).

According to an aspect of the disclosure, a wireless audio device includes a communication module, a plurality of microphones comprising an internal microphone and an external microphone, and at least one processor configured to: receive a multi-recording conversion signal from an electronic device through the communication module, enable at least one microphone of the internal microphone and the external microphone based on the multi-recording conversion signal, transmit a first audio signal generated based on a sound input through the enabled at least one microphone to the electronic device through the communication module, detect a microphone control input, selectively mute or unmute the at least one microphone of the internal microphone and the external microphone based on the microphone control input, and transmit, to the electronic device through the communication module, a second audio signal generated based on a microphone input acquired in a state where the at least one microphone of the internal microphone and the external microphone is selectively muted or unmuted based on the microphone control input.

The at least one processor may be further configured to mute the internal microphone based on a first microphone control input.

The at least one processor may be further configured to unmute the internal microphone based on a second microphone control input in a state in which the internal microphone is muted.

The at least one processor may be further configured to mute the internal microphone and the external microphone based on the first microphone control input.

The at least one processor may be further configured to unmute the internal microphone and the external microphone based on a second microphone control input in a state in which the internal microphone and the external microphone are muted.

The microphone control input may include at least one of a touch input, a voice utterance input, and a sensor input.

The at least one processor may be further configured to: detect a voice utterance, enable the internal microphone in a voice utterance input section, and mute the internal microphone in a section in which the voice utterance does not occur.

The at least one processor may be further configured to: enable the external microphone and mute the internal microphone based on the multi-recording conversion signal, unmute the internal microphone based on a user voice utterance input, and mute the internal microphone based on the user voice utterance input not being received.

The at least one processor is further configured to: perform noise canceling based on a signal acquired from the external microphone and a signal acquired from the internal microphone, and transmit, to the electronic device, the first audio signal or the second audio signal from which noise is canceled.

The at least one processor may be further configured to: based on a multi-recording mode of the electronic device being a first mode, transmit the first audio signal or the second audio signal to the electronic device based on a first sequence configured to transmit a first channel signal and a second channel signal, and based on the multi-recording mode of the electronic device being a second mode, transmit the first audio signal or the second audio signal to the electronic device based on a second sequence in which the first channel signal and the second channel signal are inverted.

According to an aspect of the disclosure, a method for controlling a microphone in a wireless audio device includes receiving a multi-recording conversion signal from an electronic device in a state that the wireless audio device establishes wireless communication connection with the electronic device, enabling at least one microphone of an internal microphone and an external microphone mounted in the wireless audio device based on the multi-recording conversion signal, transmitting a first audio signal acquired through the enabled at least one microphone to the electronic device, detecting a microphone control input, selectively muting or unmuting the at least one microphone of the internal microphone and the external microphone based on the microphone control input, and transmitting, to the electronic device, a second audio signal generated based on a microphone input acquired in a state where the at least one microphone of the internal microphone and the external microphone is selectively muted or unmuted based on the microphone control input.

The selectively muting or unmuting of the at least one microphone of the internal microphone and the external microphone may include muting the internal microphone based on the microphone control input in a state in which the external microphone and the internal microphone are enabled based on the reception of the multi-recording conversion signal.

The selectively muting or unmuting of the at least one microphone of the internal microphone and the external microphone may include unmuting the internal microphone based on the detection of the microphone control input in a state in which the internal microphone is muted.

The selectively muting or unmuting of the at least one microphone of the internal microphone and the external microphone may include muting the external microphone and the internal microphone based on the microphone control input in a state in which the external microphone and the internal microphone are enabled based on the reception of the multi-recording conversion signal.

The selectively muting or unmuting of the at least one microphone of the internal microphone and the external microphone may include unmuting the external microphone and the internal microphone based on the detection of the microphone control input in a state in which the external microphone and the internal microphone are muted.

The selectively muting or unmuting of the at least one microphone of the internal microphone and the external microphone may include detecting a voice utterance, enabling the internal microphone in a voice utterance input section, and muting the internal microphone in a section in which the voice utterance does not occur.

The selectively muting or unmuting of the at least one microphone of the internal microphone and the external microphone may include enabling the external microphone and muting the internal microphone based on the multi-recording conversion signal, unmuting the internal microphone based on a user voice utterance input, and muting the internal microphone based on the user voice utterance input not being received.

The method may further include performing noise canceling based on a signal acquired from the external microphone and a signal acquired from the internal microphone.

Based on a multi-recording mode of the electronic device being a first mode, the first audio signal and the second audio signal may be transmitted to the electronic device in a first sequence configured to transmit a first channel signal and a second channel signal, and based on the multi-recording mode of the electronic device being a second mode, the first audio signal and the second audio signal may be transmitted to the electronic device based on a second sequence in which the first channel signal and the second channel signal are inverted.

According to an aspect of the disclosure, there is provided a non-transitory computer-readable recording medium having recorded thereon a program for executing the method for controlling a microphone input/output in a wireless audio device.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

Figure 1:
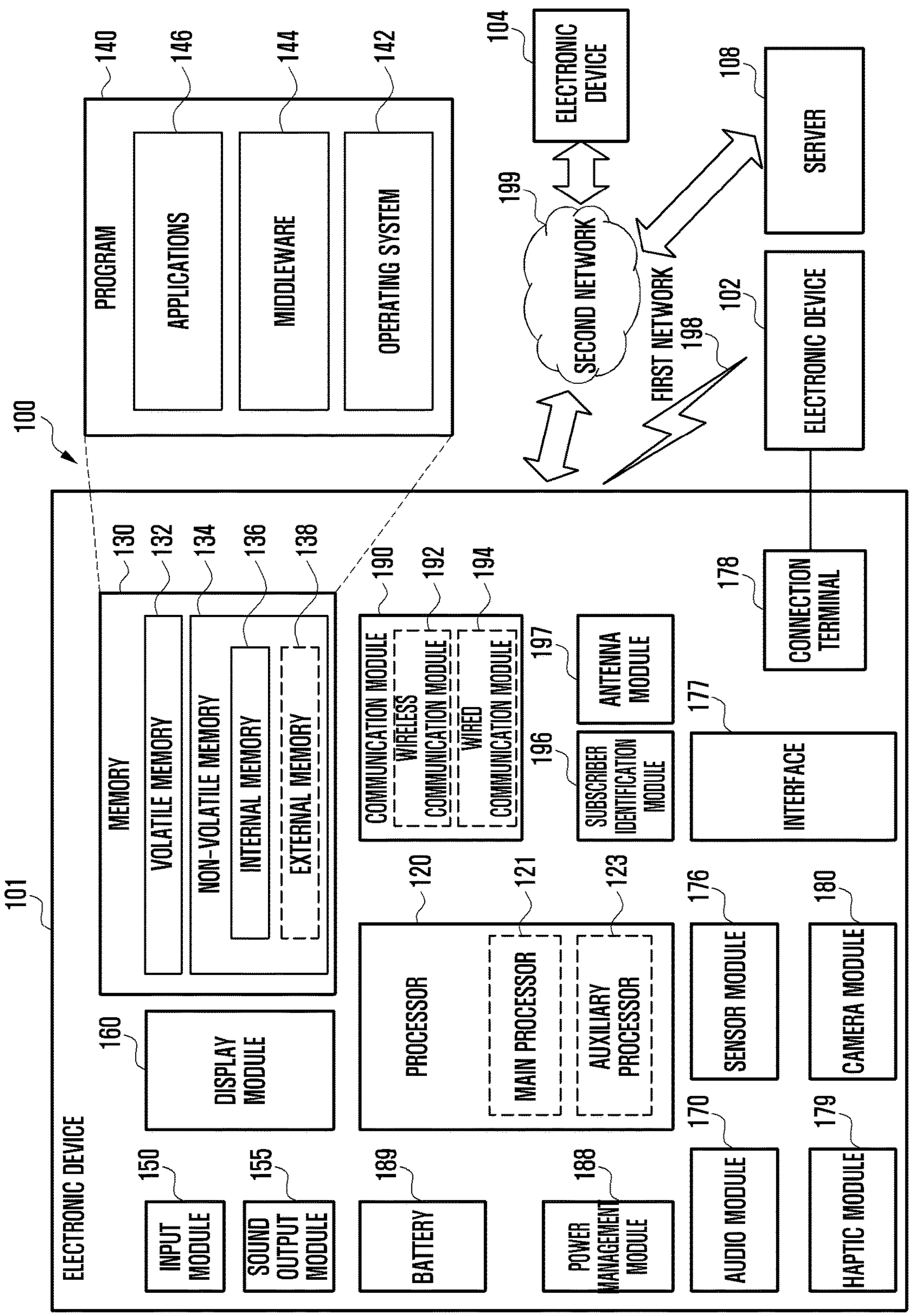
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector.

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
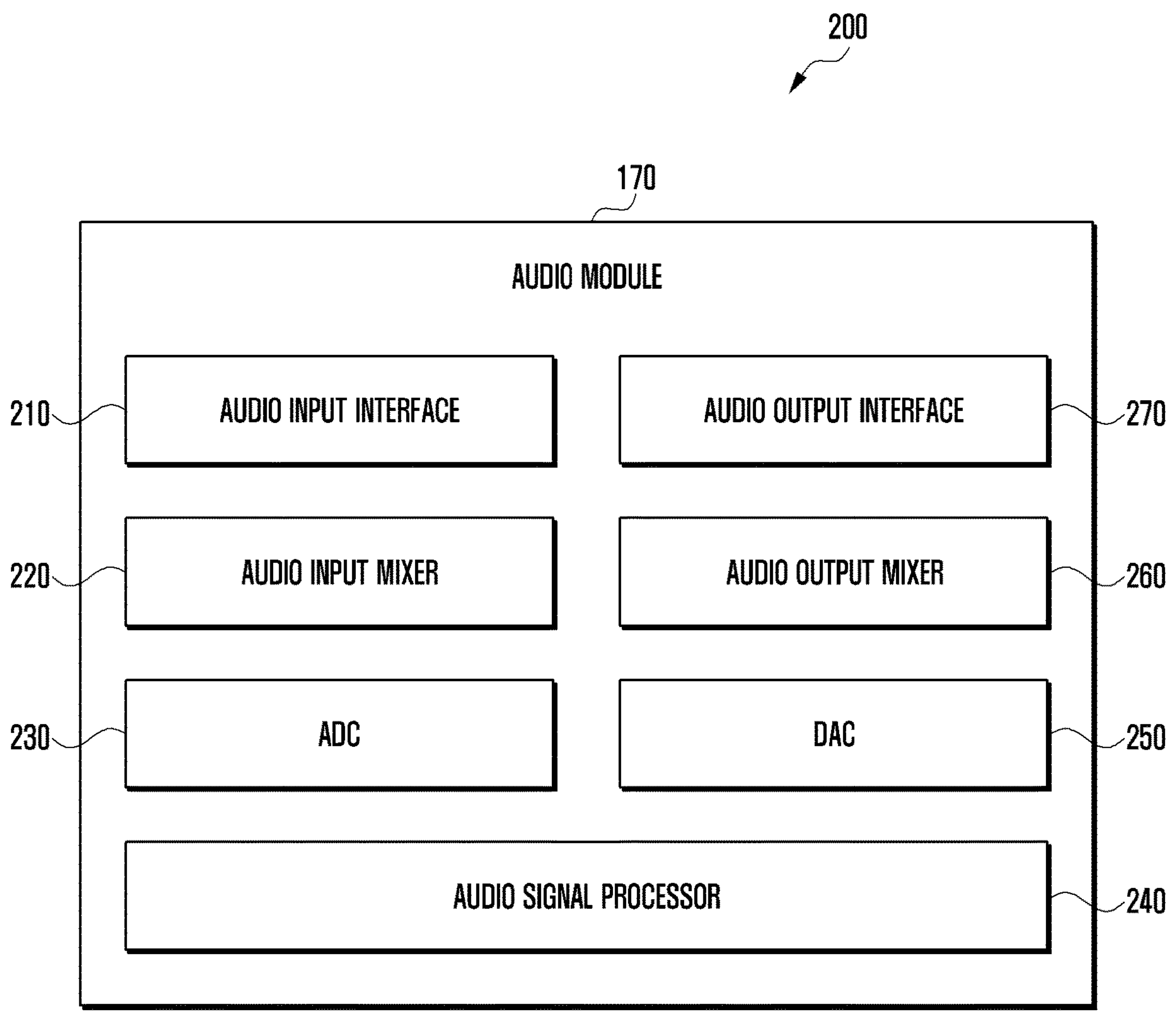
FIG. 2 is a block diagram illustrating an audio module according to various embodiments.

FIG. 2 is a block diagram 200 illustrating the audio module 170 according to various embodiments.

Referring to FIG. 2, the audio module 170 may include, for example, an audio input interface 210, an audio input mixer 220, an analog-to-digital converter (ADC) 230, an audio signal processor 240, a digital-to-analog converter (DAC) 250, an audio output mixer 260, or an audio output interface 270.

The audio input interface 210 may receive an audio signal corresponding to a sound obtained from the outside of the electronic device 101 via a microphone (e.g., a dynamic microphone, a condenser microphone, or a piezo microphone) that is configured as part of the input module 150 or separately from the electronic device 101. For example, if an audio signal is obtained from the external electronic device 102 (e.g., a headset or a microphone), the audio input interface 210 may be connected with the external electronic device 102 directly via the connecting terminal 178, or wirelessly (e.g., Bluetooth™ communication) via the wireless communication module 192 to receive the audio signal. According to an embodiment, the audio input interface 210 may receive a control signal (e.g., a volume adjustment signal received via an input button) related to the audio signal obtained from the external electronic device 102. The audio input interface 210 may include a plurality of audio input channels and may receive a different audio signal via a corresponding one of the plurality of audio input channels, respectively. According to an embodiment, additionally or alternatively, the audio input interface 210 may receive an audio signal from another component (e.g., the processor 120 or the memory 130) of the electronic device 101.

The audio input mixer 220 may synthesize a plurality of inputted audio signals into at least one audio signal. For example, according to an embodiment, the audio input mixer 220 may synthesize a plurality of analog audio signals inputted via the audio input interface 210 into at least one analog audio signal.

The ADC 230 may convert an analog audio signal into a digital audio signal. For example, according to an embodiment, the ADC 230 may convert an analog audio signal received via the audio input interface 210 or, additionally or alternatively, an analog audio signal synthesized via the audio input mixer 220 into a digital audio signal.

The audio signal processor 240 may perform various processing on a digital audio signal received via the ADC 230 or a digital audio signal received from another component of the electronic device 101. For example, according to an embodiment, the audio signal processor 240 may perform changing a sampling rate, applying one or more filters, interpolation processing, amplifying or attenuating a whole or partial frequency bandwidth, noise processing (e.g., attenuating noise or echoes), changing channels (e.g., switching between mono and stereo), mixing, or extracting a specified signal for one or more digital audio signals. According to an embodiment, one or more functions of the audio signal processor 240 may be implemented in the form of an equalizer.

The DAC 250 may convert a digital audio signal into an analog audio signal. For example, according to an embodiment, the DAC 250 may convert a digital audio signal processed by the audio signal processor 240 or a digital audio signal obtained from another component (e.g., the processor (120) or the memory (130)) of the electronic device 101 into an analog audio signal.

The audio output mixer 260 may synthesize a plurality of audio signals, which are to be outputted, into at least one audio signal. For example, according to an embodiment, the audio output mixer 260 may synthesize an analog audio signal converted by the DAC 250 and another analog audio signal (e.g., an analog audio signal received via the audio input interface 210) into at least one analog audio signal.

The audio output interface 270 may output an analog audio signal converted by the DAC 250 or, additionally or alternatively, an analog audio signal synthesized by the audio output mixer 260 to the outside of the electronic device 101 via the sound output module 155. The sound output module 155 may include, for example, a speaker, such as a dynamic driver or a balanced armature driver, or a receiver. According to an embodiment, the sound output module 155 may include a plurality of speakers. In such a case, the audio output interface 270 may output audio signals having a plurality of different channels (e.g., stereo channels or 5.1 channels) via at least some of the plurality of speakers. According to an embodiment, the audio output interface 270 may be connected with the external electronic device 102 (e.g., an external speaker or a headset) directly via the connecting terminal 178 or wirelessly via the wireless communication module 192 to output an audio signal.

According to an embodiment, the audio module 170 may generate, without separately including the audio input mixer 220 or the audio output mixer 260, at least one digital audio signal by synthesizing a plurality of digital audio signals using at least one function of the audio signal processor 240.

According to an embodiment, the audio module 170 may include an audio amplifier (not shown) (e.g., a speaker amplifying circuit) that is capable of amplifying an analog audio signal inputted via the audio input interface 210 or an audio signal that is to be outputted via the audio output interface 270. According to an embodiment, the audio amplifier may be configured as a module separate from the audio module 170.

The electronic device 101 according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

Figure 3:
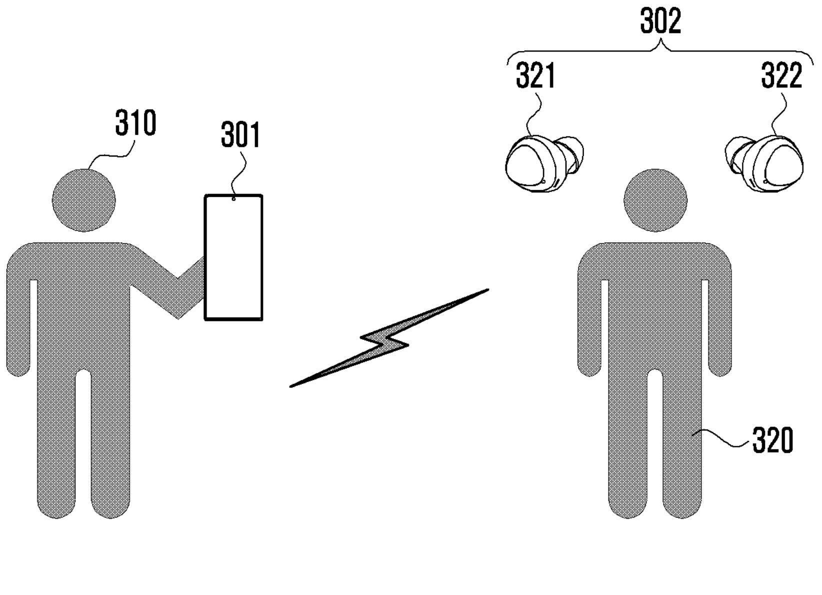
FIG. 3 is a view illustrating a multi-recording operation using a wireless audio device and an electronic device according to various embodiments.

FIG. 3 is a view illustrating a multi-recording operation using a wireless audio device and an electronic device according to various embodiments.

Referring to FIG. 3, an electronic device 301 (e.g., the electronic device 101 in FIG. 1) and a wireless audio device 302 according to an embodiment may support a multi-recording function (e.g., multi video recording or multi audio recording). The multi-recording function corresponds to a function using a microphone of the electronic device 301 and the wireless audio device 302 (e.g., Bluetooth wireless device) and may include an image photographing or audio recording function.

The electronic device 301 may perform a recording function using the wireless audio device 302 in a state of having communication connection with the wireless audio device 302. According to an embodiment, the electronic device 301 and the wireless audio device 302 may be connected through near field wireless communication (e.g., Bluetooth, Wi-Fi, Wi-Fi direct, Wi-Fi aware, ultra-wideband (UWB), and/or infrared data association (IrDA)).

According to an embodiment, a first user 310 of the electronic device 301 may execute a recording function of the electronic device 301 and select a Bluetooth microphone use item (or function). A mode of the electronic device 301 may be converted to a multi-recording mode according to a request of the first user 310. According to an embodiment, the electronic device 301 may support the multi-recording mode for generating image data and/or audio data through a camera (e.g., the camera module 180 in FIG. 1) and/or the audio module (e.g., the audio module 170 in FIG. 1) included in the electronic device 301 and at least one microphone of the wireless audio device 302 having communication connection (e.g., pairing) with the electronic device 301. For example, the first user 310 of the electronic device 301 may photograph a second user 320 wearing the wireless audio device 302 by using a camera of the electronic device 301. By executing the multi-recording function using the microphone of the wireless audio device 302, the first user 310 may generate image data from the camera of the electronic device 301 and generate an audio signal from microphones of the electronic device 301 and microphones of the wireless audio device 302 to record an image.

The wireless audio device 302 may include an ear wearable device, a wireless earphone, a wireless headset, an ear bud, or a true wireless stereo (TWS) device and may be replaced by electronic devices including wireless communication and a microphone. For example, the wireless audio device 302 in FIG. 3 is an ear wearable type designed to be worn on an ear of a user and may include a first ear device 321 designed to be worn on the left ear of the user and a second ear device 322 designed to be worn on the right ear of the user, but is not limited thereto. The electronic device 301 may have connection (e.g., single pairing) with one of the first ear device 321 and the second ear device 322 operating as a master. In addition, the electronic device 301 may be paired with each of the first ear device 321 and the second ear device 322.

According to an embodiment, the first ear device 321 and the second ear device 322 as one wireless audio device 302 may be connected to the electronic device 301 through the same mac address. For example, one device (e.g., primary equipment (PE)) of the first ear device 321 and the second ear device 322 may be representatively connected to the electronic device 301 and the other device (e.g., secondary equipment (SE)) may eavesdrop a signal transferred to the one device (e.g., primary equipment (PE)) connected to the electronic device 301 through sniffing. According to an embodiment, the electronic device 301 may identify that the first ear device 321 and the second ear device 322 are connected to each other in one pair.

According to an embodiment, the wireless audio device 302 may perform a function related to an audio input/output by receiving a control signal from the electronic device 301 or according to a control signal generated from the wireless audio device 302. The control signal received from the electronic device 301 may be a signal with respect to at least one of a play function, a call function, a stop function, a volume control function, and/or a recording function related to an audio input/output.

The wireless audio device 302 may acquire an audio signal from the electronic device 301 and perform a function of outputting a sound through a speaker. The wireless audio device 302 may receive an external sound through microphones and output the received sound through a speaker or convert the received sound into an audio signal to be transferred to the electronic device 301.

According to an embodiment, the electronic device 301 may transmit a multi-recording conversion signal to the wireless audio device 302 based on execution of the multi-recording function. The wireless audio device 302 may enable at least one of multiple microphones (e.g., an external microphone and/or an internal microphone) in response to the multi-recording conversion signal and transmit, to the electronic device 301, an audio signal based on an enabled microphone input.

According to an embodiment, the wireless audio device 302 may detect a microphone control input in the multi-recording mode with the electronic device 301 and may perform control to mute or unmute at least some of microphone inputs based on a detected microphone control input condition. For example, in case of receiving, from the electronic device 301, a signal (e.g., a microphone control input signal) indicating that the electronic device 301 is operated in the multi-recording mode, the wireless audio device 302 may be operated in the multi-recording mode for receiving an outer sound through at least one microphone included in the wireless audio device 302. The wireless audio device 302 may transmit, to the electronic device 301, an audio signal based on an input of microphone inputs of which at least one input is muted or unmuted. For example, the wireless audio device 302 may not transmit, to the electronic device 301, an audio signal based on a muted microphone input. For another example, the wireless audio device 302 may transmit, to the electronic device 301, an audio signal collected based on an unmuted microphone input.

According to an embodiment, the wireless audio device 302 may detect a microphone control input in the multi-recording mode with the electronic device 301 and may perform control to mute inputs of multiple microphones based on a detected microphone control input condition. Since at least some of microphone inputs are muted, the wireless audio device 302 may not transmit an audio signal to the electronic device 301.

Additionally, the electronic device 301 may have wireless communication connection with other wireless electronic devices together with the wireless audio device. For example, the electronic device may receive an input for controlling detailed functions of the wireless audio device through a wireless electronic device (e.g., a watch-type device). The electronic device may perform control to mute or unmute with respect to the internal microphone or the external microphone of the wireless audio device by transferring, to the wireless audio device, a control signal for detailed function configuration of the wireless audio device received from the wireless electronic device.

Figure 4:
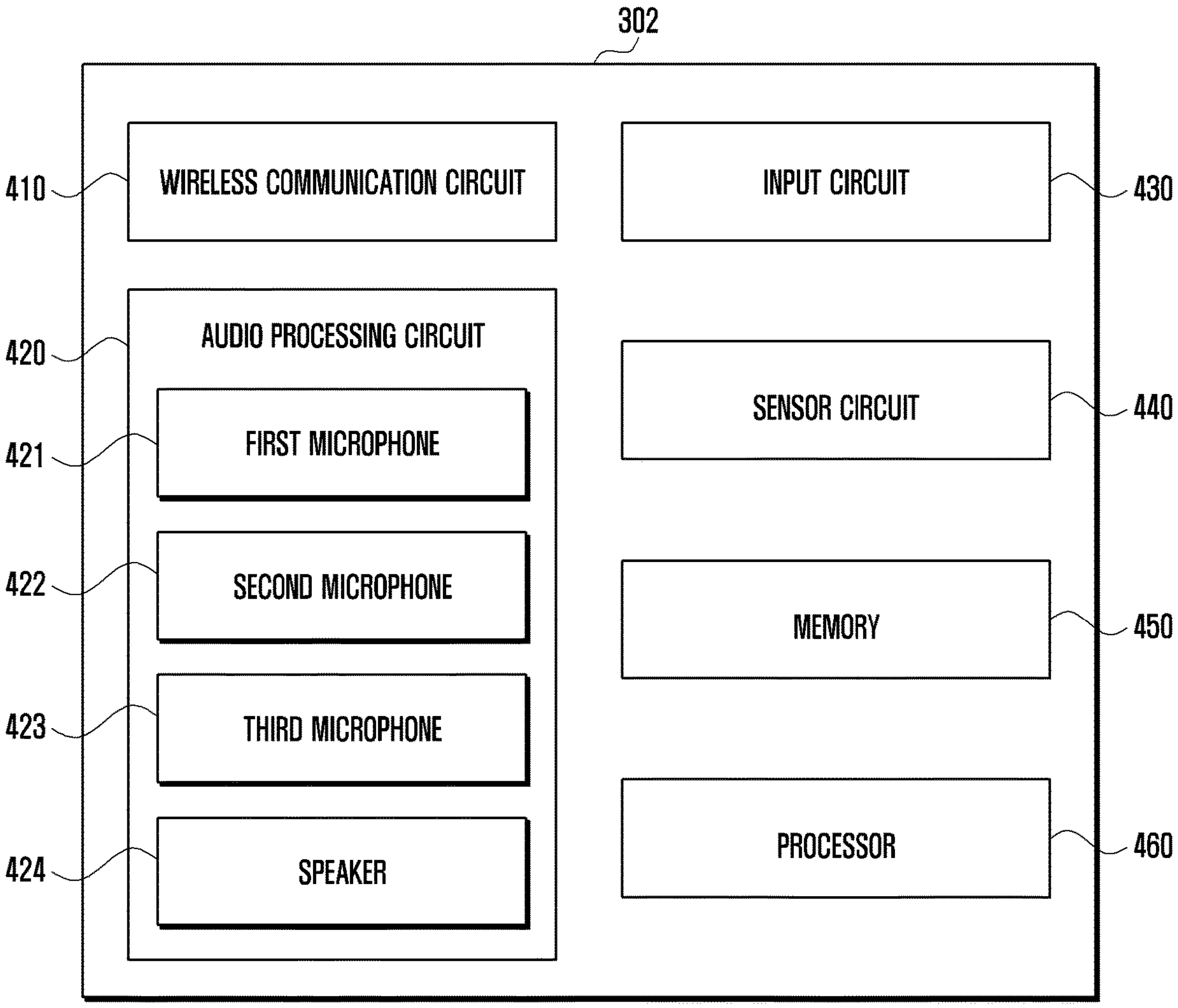
FIG. 4 is a block diagram of a wireless audio device according to an embodiment.

FIG. 4 is a block diagram of a wireless audio device according to an embodiment.

Referring to FIG. 4, the wireless audio device 302 (e.g., the wireless audio device 302 in FIG. 3) according to an embodiment may include a wireless communication circuit 410, an audio processing circuit 420, an input circuit 430, a sensor circuit 440, a memory 450, and a processor 460. According to an embodiment, the wireless audio device 302 may include the configuration of the audio module 170 in FIG. 2 or at least a portion thereof.

For example, in case that the wireless audio device 302 includes the first ear device 321 and the second ear device 322 as shown in FIG. 3, the first ear device 321 and the second ear device 322 each may include a wireless communication circuit 410, an audio processing circuit 420, an input circuit 430, a sensor circuit 440, a memory 450, and a processor 460. In various embodiments, each of the first ear device 321 and the second ear device 322 may independently operate.

The wireless communication circuit 410 may include a near field wireless communication circuit. The near field wireless communication circuit may establish wireless communication with an electronic device (e.g., the electronic device 301 in FIG. 3).

The audio processing circuit 420 may include multiple microphones (e.g., a first microphone 421, a second microphone 422, and a third microphone 423) and a speaker 424.

According to an embodiment, the first microphone 421 and the second microphone 422 correspond to an external microphone and an outer microphone and may receive an ambient voice signal of the wireless audio device 302. The third microphone 423 corresponds to an internal microphone or an in-ear microphone mounted inside a device and may detect an in-body sound and a resonance sound in the ear. The speaker 424 may output an audio signal. According to an embodiment, the number and/or positions of the multiple microphones (e.g., the first microphone 421 to the third microphone 423) and/or the speaker (e.g., the 424) included in the wireless audio device 302 may not be limited by the description above. For example, the wireless audio device 302 may include two or more, or four or more microphones and multiple speakers.

The input circuit 430 may include a touch pad. The wireless audio device 302 may detect a user input (e.g., a touch input) through the input circuit 430 and request audio signal processing (e.g., volume control, playing, or stop playing) to the electronic device 301 in response to the user input.

According to an embodiment, in the multi-recording mode with the electronic device 301, the input circuit 430 may detect a microphone control input and transfer the same to the processor 460. The processor 460 may perform control to mute or unmute a microphone input to be transferred to the electronic device 301 based on the microphone control input.

The sensor circuit 440 may include at least one of an acceleration sensor, a gyro sensor, a grip sensor, a vibration sensor, a biosensor, and/or a proximity sensor. The sensor circuit 440 may detect a change in movement of the wireless audio device 302. The sensor circuit 440 may detect whether a user wears the wireless audio device 302. In case that the wearer of the wireless audio device 302 speaks, the sensor circuit 440 may detect vibration of the vocal cords through, for example, the user's bones and/or skin. The sensor circuit 440 may detect an utterance of the wearer. Alternatively, the sensor circuit 440 may detect vibration to detect the utterance of the wearer through whether the user's jaw is moving.

According to an embodiment, the sensor circuit 440 may sense an utterance of the wearer in the multi-recording mode, and transfer the same to the processor 460. The processor 460 may identify a speech section and a speech-free section based on the utterance of the wearer. The processor 460 may receive the utterance of the wearer as a microphone control input, and may perform control to mute a microphone (e.g., the internal microphone) input to be transferred to the electronic device 301 in the speech section and unmute a microphone (e.g., the internal microphone) input to be transferred to the electronic device 301 in the speech-free section.

The memory 450 may be operatively connected to components (e.g., the wireless communication circuit 410, the audio processing circuit 42, the input circuit 430, the sensor circuit 440, and/or the processor 460) of the audio module 170 and may store instructions, when executed, to perform designated operations of the components. Further, the memory 450 may store information related to the paired electronic device 301.

The processor 460 may enable the audio processing circuit 420 (or the multiple microphones 421, 422, and 423 and/or the speaker 424) based on a multi-recording conversion signal received from the electronic device 301. The processor 460 may generate an audio signal based on a sound acquired from the enabled microphones and transfer the same to the electronic device 301 through the wireless communication circuit 410.

According to an embodiment, the processor 460 may receive a microphone control input detected through the sensor circuit 440 or the input circuit 430 in the multi-recording mode with the electronic device 301 and may perform control to selectively mute or unmute a microphone input based on the microphone control input. The processor 460 may acquire an external sound from the microphones selectively unmuted by a microphone control input of a user and transfer the same to the electronic device 301.

According to an embodiment, depending on a microphone control input in the multi-recording mode, the processor 460 may transmit an audio signal acquired through the external microphone (e.g., the first microphone 421 and/or the second microphone 422) to the electronic device 301, or transmit an audio signal acquired from the external microphone (e.g., the first microphone 421 and/or the second microphone 422) and the internal microphone (e.g., the third microphone 423) to the electronic device 301. Alternatively, depending on a microphone control input in the multi-recording mode, the processor 460 may block an input of the external microphone (e.g., the first microphone 421 and/or the second microphone 422) and the internal microphone (e.g., the third microphone 423) and may not transmit the same to the electronic device 301.

According to an embodiment, the processor 460 may transmit an audio signal to the electronic device 301 or process the audio signal to distinguish sounds (e.g., an audio signal acquired from the external microphone or an audio signal acquired from the internal microphone) received from the external microphone (e.g., the first microphone 421 and/or the second microphone 422) and the internal microphone (e.g., the third microphone 423). By way of example, the wireless audio device 302 may transmit a signal transmission packet of the external microphone (e.g., the first microphone 421 and/or the second microphone 422) and a signal transmission packet of the internal microphone (e.g., the third microphone 423) to be distinguished or mark microphone information in a packet and transmit the packet.

According to an embodiment, in case that the wireless audio device 302 includes a set of the first ear device 321 and the second ear device 322, the processor 460 may process audio signals to allow an audio signal (e.g., a first channel or a right channel) acquired from the first ear device 321 and an audio signal (e.g., a second channel or a left channel) acquired from the second ear device 322 to be distinguished or transmit the same to the electronic device 301. For example, the processor 460 may transmit a first channel signal packet and a second channel signal packet to be distinguished or include channel information in a packet and transmit the packet. The processor 460 may include channel information and microphone position information (e.g., internal or external) in an audio signal and transmit the audio signal to the electronic device 301. According to an embodiment, an audio signal transmission order of the electronic device 301, the first ear device 321, and/or the second ear device 322 may be designated. For example, the first ear device 321 may transmit an audio signal to the electronic device 301 in a first time section and the second ear device 322 may transmit an audio signal to the electronic device 301 in a second time section. The first time section and the second time section may be determined at a time point when the first ear device 321 and the second ear device 322 establish communication connection (e.g., pairing) therebetween.

A wireless audio device (e.g., the wireless audio device 302 in FIG. 3) according to various embodiments may include a communication module (e.g., the wireless communication circuit 410 in FIG. 4), multiple microphones (e.g., the first microphone 421, the second microphone 422, and the third microphone 423 in FIG. 4) including an internal microphone and an external microphone, and at least one processor (e.g., the processor 460 in FIG. 4), wherein the at least one processor 460 is configured to receive a multi-recording conversion signal from an electronic device (e.g., the electronic device 101 in FIG. 1 or the electronic device 301 in FIG. 3) through the communication module, enable at least one of the internal microphone and the external microphone based on the multi-recording conversion signal, transmit a first audio signal generated based on a sound input through the enabled microphone to the electronic device, detect a microphone control input, perform control to selectively mute or unmute at least one of the internal microphone and the external microphone based on the microphone control input, and transmit, to the electronic device, a second audio signal generated based on a microphone input acquired in a state where the at least one of the internal microphone and the external microphone is selectively muted or unmuted according to a condition of the microphone control input.

The processor 460 according to various embodiments may be further configured to mute the internal microphone based on the microphone control input.

The processor 460 according to various embodiments may be configured to unmute the internal microphone based on the microphone control input in a state that the inner microphone is muted.

The processor 460 according to various embodiments may be further configured to mute the internal microphone and the external microphone based on the microphone control input.

The processor 460 according to various embodiments may be configured to unmute the internal microphone and the external microphone based on the microphone control input in a state that internal microphone and the external microphone are muted.

The microphone control input according to various embodiments may include at least one of a touch input, a voice utterance input, and a sensor input.

The processor 460 according to various embodiments may be further configured to detect a voice utterance, enable the internal microphone in a voice utterance input section, and mute the internal microphone in a section in which a voice utterance does not occur.

The processor 460 according to various embodiments may be further configured to enable the external microphone and mute the internal microphone based on the multi-recording conversion signal, unmute the internal microphone based on a user voice utterance input, and mute the internal microphone based on a state in which the user voice utterance input is not received.

The processor 460 according to various embodiments may be further configured to perform noise canceling based on a signal acquired from the external microphone and a signal acquired from the internal microphone and transmit, to the electronic device, a first audio signal or a second audio signal from which noise is canceled.

The processor 460 according to various embodiments may be configured to transmit the first audio signal or the second audio signal to the electronic device based on a first sequence for transmitting a first channel signal and a second channel signal in case that the multi-recording mode of the electronic device is a first mode and transmit the first audio signal or the second audio signal to the electronic device based on a second sequence in which the first channel signal and the second channel signal are inverted in case of a second mode.

Figure 5:
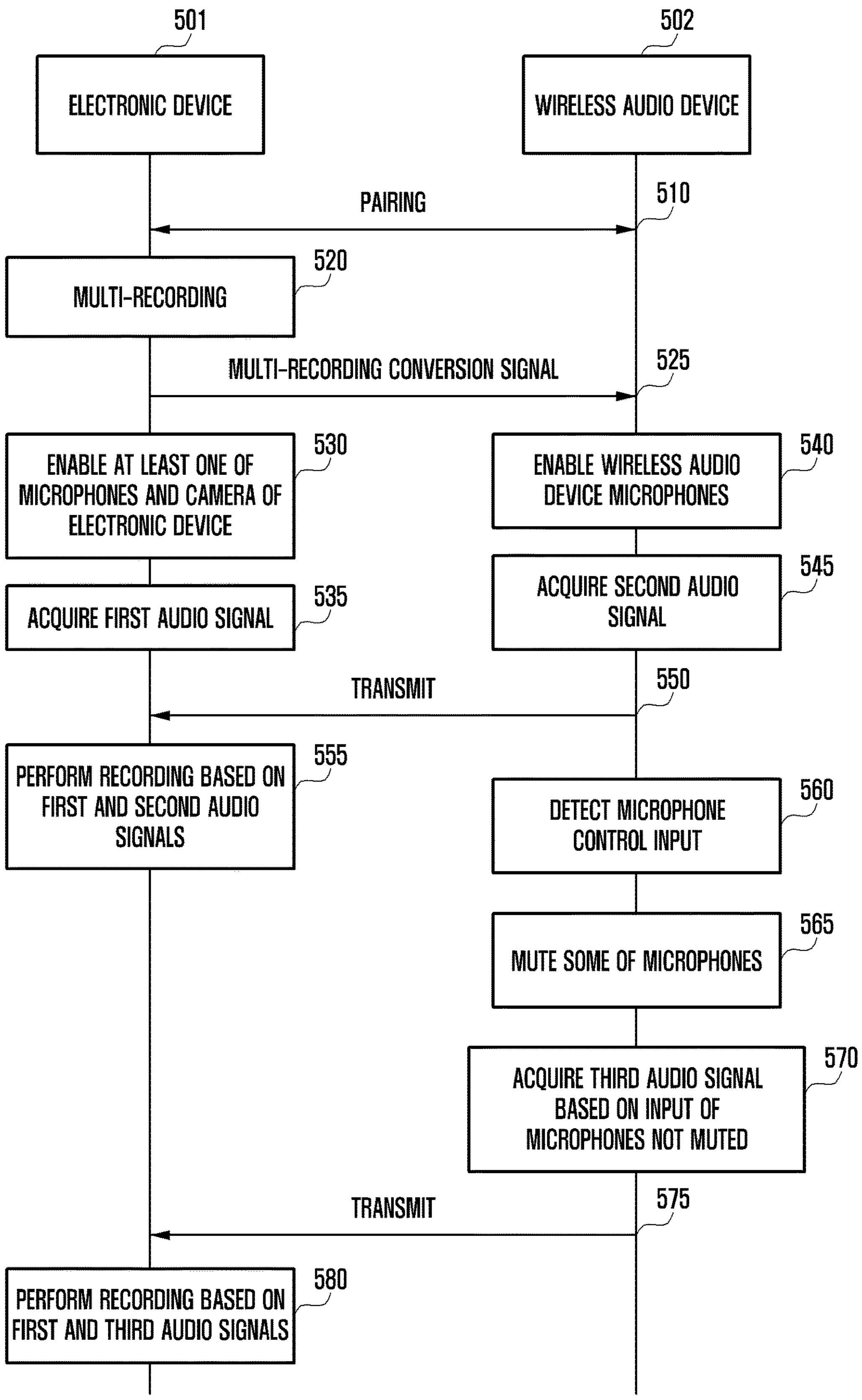
FIG. 5 illustrates a method for controlling a microphone input/output in a wireless audio device during multi-recording of an electronic device according to various embodiments.

FIG. 5 illustrates a method for controlling a microphone input/output in a wireless audio device during multi-recording of an electronic device according to various embodiments.

Referring to FIG. 5, according to an embodiment, in operation 510, the electronic device 501 (e.g., the electronic device 301 in FIG. 1) and the wireless audio device 502 (e.g., the wireless audio device 302 in FIG. 3) may establish wireless communication connection (e.g., pairing) therebetween. For example, communication link (or transmission link) based on Bluetooth communication (e.g., Bluetooth pairing) may be established between the electronic device 501 and the wireless audio device 502.

In operation 520, based on a user request, the electronic device 501 may perform a multi-recording (e.g., a stereo audio recording or stereo video recording, dual audio recording, dual video recording, binaural audio recording, or binaural video recording) function by using a microphone of an external device (e.g., a wireless audio device) together with a microphone of the electronic device 501.

For example, the electronic device 501 may perform a multi-recording function (e.g., image photographing) according to selection by a user of a Bluetooth microphone use item (or function). According to an embodiment, the electronic device 501 may display external devices (e.g., a Bluetooth device) including microphones which may be enabled, through a user interface (UI). With reference to the display information, the user may perform multi-recording function by selecting external devices to be used for the multi-recording. According to an embodiment, during execution of the multi-recording function, the electronic device 501 may display a list of external devices having communication connection (e.g., pairing) with the electronic device 501. According to another embodiment, during execution of the multi-recording function, the electronic device 501 may display a list of external devices (e.g., a Bluetooth supporting device) which may have communication connection with the electronic device 501 and perform communication connection (e.g., pairing) based on selection of the user.

In operation 525, the electronic device 501 may transmit a multi-recording conversion signal to the paired wireless audio device 502 based on execution of the multi-recording function.

According to some embodiments, the electronic device 501 may include ON and/or OFF configuration information of the internal microphone or the external microphone of the wireless audio device 502 in the multi-recording conversion signal and transmit the multi-recording conversion signal including the ON and/or OFF configuration information is included. For example, the electronic device 501 may include internal or external microphone ON configuration information in the multi-recording conversion signal and transmits the multi-recording conversion signal including the internal or external microphone ON configuration information included or include internal or external microphone OFF configuration information in the multi-recording conversion signal and transmits the multi-recording conversion signal including the internal or external microphone OFF configuration information. According to some embodiments, the wireless audio device 502 may have a default internal and external microphone ON configuration in response to the multi-recording conversion signal of the electronic device 501.

In operation 530, the electronic device 501 may enable at least one microphone of microphones and a camera of the electronic device (e.g., microphones mounted in the electronic device) based on execution of the multi-recording function.

In operation 535, the electronic device 501 may acquire a first audio signal based on a sound acquired through the enabled at least one microphone of the microphones of the electronic device. Additionally, the electronic device 501 may acquire image data from the camera together with the first audio signal.

In operation 540, the wireless audio device 502 may enable microphones included in the wireless audio device 502 based on the multi-recording conversion signal received from the electronic device 501. The microphones of the wireless audio device 502 may include at least one of an external microphone or an internal microphone. According to an embodiment, the wireless audio device 502 may enable at least one of the microphones of the wireless audio device 502 based on the multi-recording conversion signal.

According to some embodiments, during performing a recording function, the wireless audio device 502 may be initially configured to enable the external microphone and the internal microphone. According to another embodiment, the wireless audio device 502 may be initially configured to enable the external microphone and the internal microphone in the recording function and mute the internal microphone.

In operation 545, the wireless audio device 502 may acquire a second audio signal through the enabled microphones.

In operation 550, the wireless audio device 502 may transmit the acquired second audio signal to the electronic device 501.

In operation 550, the electronic device 501 may perform recording based on the first audio signal acquired from the microphones of the electronic device 501 and the second audio signal acquired from the microphones of the wireless audio device 502.

According to some embodiments, the electronic device 501 or the wireless audio device 502 may perform a noise canceling operation. The noise canceling may mean blocking a sound that is not a sound to be recorded but is introduced from the outside. For example, the electronic device 501 or the wireless audio device 502 may perform noise canceling by measuring a sound introduced through the external microphone and the internal microphone in the form of a sound wave and outputting a sound wave corresponding to an opposite phase of the sound wave through a speaker. The noise in the wireless audio device 502 may be counterbalanced or removed by a sound wave having an opposite phase. The noise canceling may be performed in various ways to remove noise. The electronic device 501 may perform recording based on an audio signal from which noise is canceled.

According to an embodiment, the electronic device 501 and the wireless audio device 502 may include information about a time point at which the audio signal is acquired in audio data. For example, the electronic device 501 may store information about a time point at which the first audio signal is acquired in the audio data and the wireless audio device 502 may store information about a time point at which the second audio signal is acquired in the audio data. The electronic device 501 and the wireless audio device 502 may store a time point at which the audio signal is acquired through a synchronized timer.

According to an embodiment, the electronic device 501 may perform the multi-recording function based on an image signal acquired through a camera (e.g., the camera module 180 in FIG. 1) of the electronic device 501, an audio signal acquired through a microphone (e.g., the audio module 170 in FIG. 1) of the electronic device 501, and/or an audio signal acquired through a microphone (e.g., the first microphone 421, the second microphone 422, and/or the third microphone 423 in FIG. 4) of the wireless audio device 502.

In operation 560, the wireless audio device 502 may detect a microphone control input in the multi-recording mode.

According to an embodiment, the wireless audio device 502 may detect an input designated as the microphone control input, for example, a long-touch input or a designated number of touch inputs through an input circuit (e.g., the input circuit 430 in FIG. 4).

According to some embodiments, the wireless audio device 502 may detect that an utterance of a user or a wearer of the wireless audio device 502 is ended through a sensor circuit (e.g., the sensor circuit 440 in FIG. 4).

In operation 565, the wireless audio device 502 may perform control to mute some of the microphones of the wireless audio device 502 based on the detected microphone control input. For instance, the wireless audio device 502 may perform control to mute the external microphone or the internal microphone based on the detected microphone control input.

According to an embodiment, in case of a condition in which the internal microphone is muted based on the microphone control input, the wireless audio device 502 may perform control to mute (e.g., mute or disenable) the internal microphone.

In operation 570, the wireless audio device 502 may acquire a third audio signal based on a sound acquired from microphones not muted among the microphones of the wireless audio device 502. In operation 575, the wireless audio device 502 may transmit the third audio signal to the electronic device 501.

In operation 580, the electronic device 501 may perform recording based on the first and third audio signals.

Figure 6:
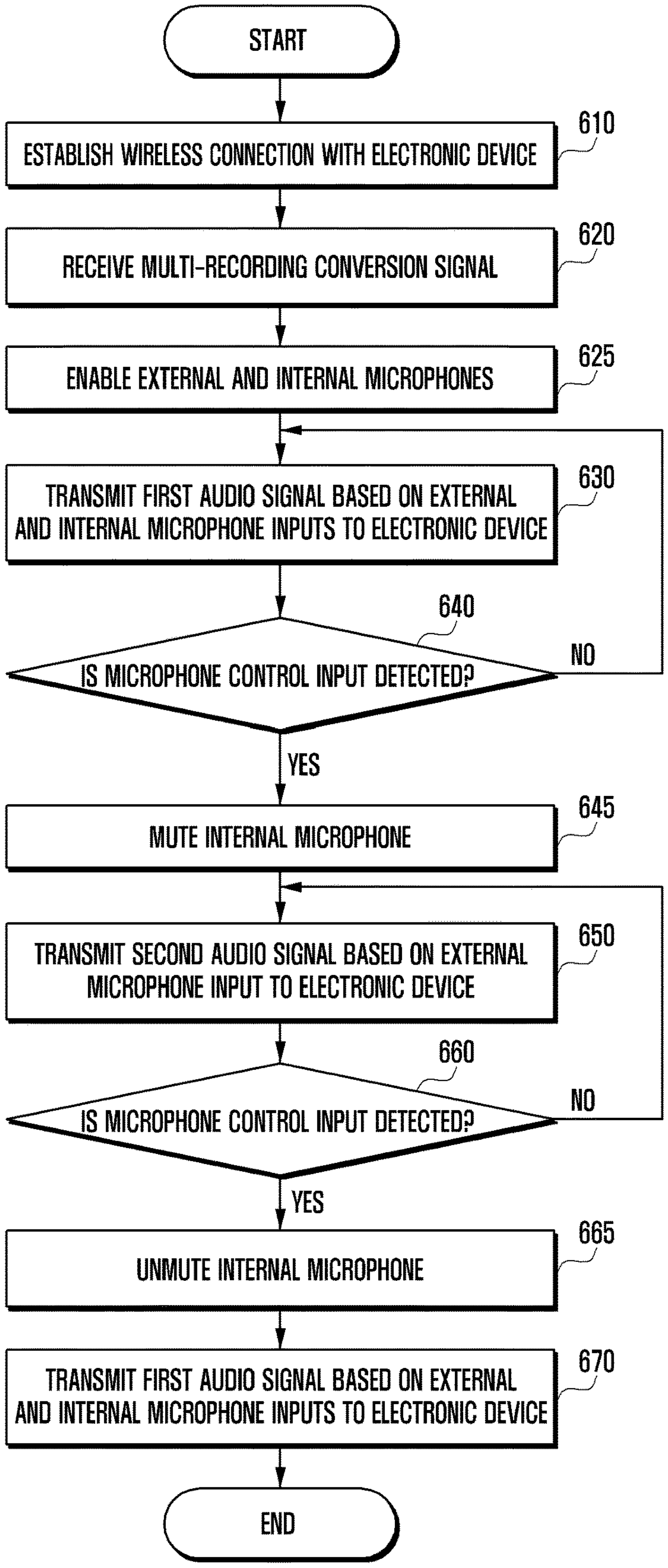
FIG. 6 illustrates a method for controlling a microphone input/output in a wireless audio device during multi-recording of an electronic device according to various embodiments.

FIG. 6 illustrates a method for controlling a microphone input/output in a wireless audio device during multi-recording of an electronic device according to various embodiments.

Referring to FIG. 6, according to an embodiment, in operation 610, a processor (e.g., the processor 460 in FIG. 4) of a wireless audio device (e.g., the wireless audio device 302 in FIG. 3 or the wireless audio device 502 in FIG. 5) may have wireless communication connection (e.g., pairing) with an electronic device (e.g., the electronic device 301 in FIG. 3 or the electronic device 501 in FIG. 5) through the wireless communication circuit 410. For example, communication link (or transmission link) based on Bluetooth communication (e.g., Bluetooth pairing) may be established between the electronic device 301 and the wireless audio device 302.

In operation 620, the processor 460 may receive a multi-recording conversion signal operating with the electronic device 301 from the electronic device 301.

In operation 625, the processor 460 may enable external and internal microphones to wait for a microphone input based on the multi-recording conversion signal received from the electronic device 301. The processor 460 may acquire a sound through the external and internal microphones and generate a first audio signal based thereon.

According to an embodiment, the processor 460 may process an audio signal to include microphone position information to distinguish an external microphone signal and an internal microphone signal or include channel information including first channel information and second channel information.

In operation 630, the processor 460 may transmit, to the electronic device 301, a first audio signal generated based on the enabled external microphone and internal microphone inputs. The electronic device 301 may perform recording by combining an audio signal acquired from microphones of the electronic device 301 and an audio signal acquired from microphones of the wireless audio device 302.

In operation 640, the processor 460 may detect a microphone control input in the multi-recording mode. For example, the wireless audio device 302 may detect an input designated as the microphone control input, for example, a long-touch input or a designated number of touch inputs through the input circuit 430.

In operation 645, the processor 460 may perform control to mute the internal microphone based on the microphone control input. The wireless audio device 302 may mute a sound acquired from the internal microphone.

In operation 650, since the external microphone is enabled, the processor 460 may transmit, to the electronic device 301, a second audio signal generated based on an external microphone input.

In operation 660, the processor 460 may detect a microphone control input. For example, the wireless audio device may detect an input designated as the microphone control input, for example, a long-touch input or a designated number of touch inputs through the input circuit 430 in a condition in which the internal microphone is muted. According to an embodiment, the microphone control input received in a state in which the internal microphone is enabled and the microphone control input received in a state in which the internal microphone is muted may be the same or different.

In operation 665, the processor 460 may perform control to unmute the internal microphone. In operation 670, the processor 460 may acquire a sound from the external microphone and the re-enabled internal microphone and transmit, to the electronic device, a first audio signal generated by acquiring a sound from the external microphone and the internal microphone. The electronic device 301 may perform recording by combining an audio signal acquired from microphones of the electronic device 301 and an audio signal acquired from microphones of the wireless audio device 302.

While the electronic device performs a recording operation, a user may operate the wireless audio device to perform control to mute or unmute the internal microphone.

Figure 7:
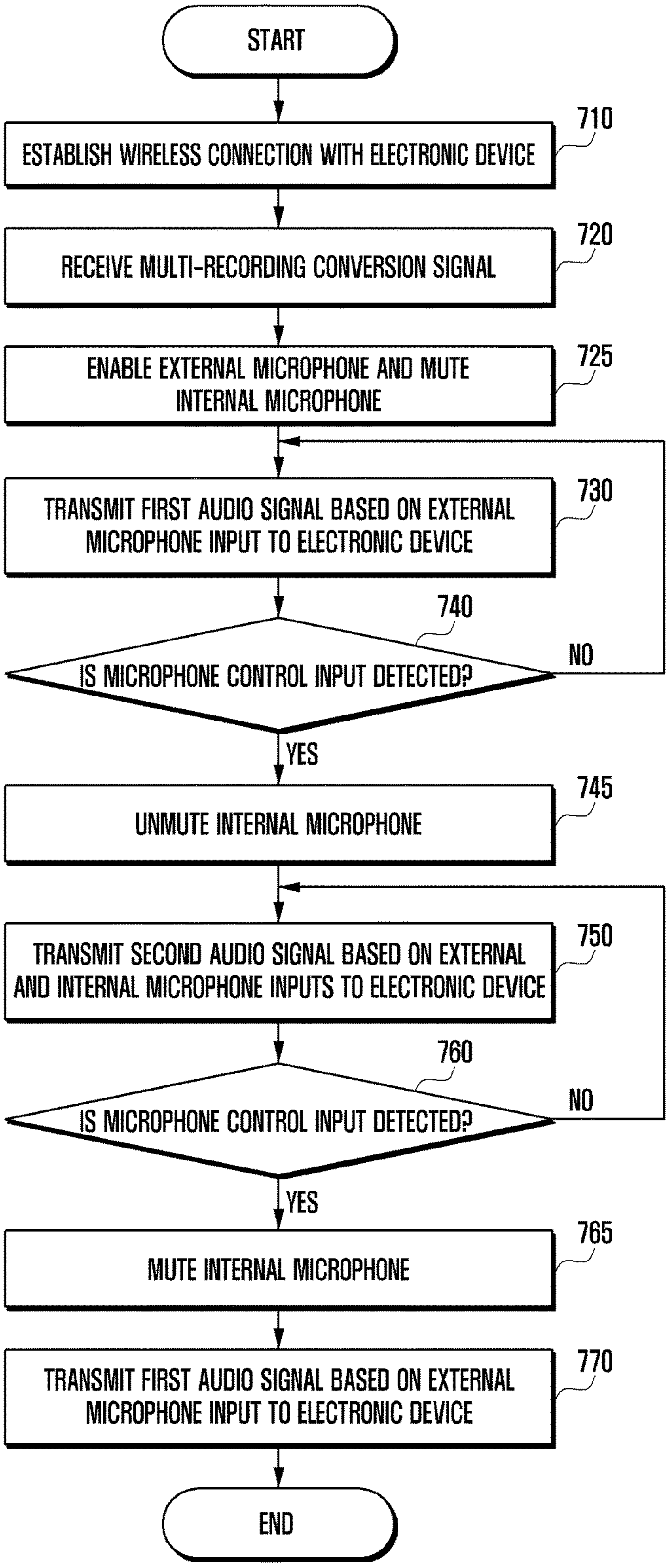
FIG. 7 illustrates a method for controlling a microphone input/output in a wireless audio device during multi-recording of an electronic device according to various embodiments.

FIG. 7 illustrates a method for controlling a microphone input/output in a wireless audio device during multi-recording of an electronic device according to various embodiments.

Referring to FIG. 7, according to an embodiment, in operation 710, a processor (e.g., the processor 460 in FIG. 4) of a wireless audio device (e.g., the wireless audio device 302 in FIG. 3 or the wireless audio device 502 in FIG. 5) may have wireless communication connection (e.g., pairing) with an electronic device (e.g., the electronic device 301 in FIG. 3 or the electronic device 501 in FIG. 5) through the wireless communication circuit 410. For example, communication link (or transmission link) based on Bluetooth communication (e.g., Bluetooth pairing) may be established between the electronic device 301 and the wireless audio device 302.

In operation 720, the processor 460 may receive a multi-recording conversion signal operating with the electronic device 301 from the electronic device 301.

In operation 725, the processor 460 may enable the external microphone and mute the internal microphone to wait for a microphone input based on the multi-recording conversion signal received from the electronic device 301. The processor 460 may acquire a sound through the external microphone and generate a first audio signal based thereon.

In operation 730, the processor 460 may transmit, to the electronic device 301, a first audio signal generated based on the enabled external microphone input. The electronic device 301 may perform recording by combining an audio signal acquired from microphones of the electronic device 301 and the first audio signal acquired from the wireless audio device 302.

In operation 740, the processor 460 may detect a microphone control input in the multi-recording mode. For example, the wireless audio device 502 may detect an utterance of a wearer (or a user) of the wireless audio device 502 through the sensor circuit 440. The wireless audio device 502 may detect vibration through the sensor circuit 440 and detect whether a user's jaw is moving. For another example, the wireless audio device 302 may detect an input designated as the microphone control input, for example, a long-touch input or a designated number of touch inputs through the input circuit 430.

In operation 745, the processor 460 may perform control to unmute the internal microphone based on the microphone control input, for example, the wearer's utterance or a designated input. The processor 460 may acquire a sound from the unmuted internal microphone and acquire a sound from the external microphone to generate a second audio signal.

In operation 750, the processor 460 may transmit, to the electronic device 301, a second audio signal generated based on internal microphone and external microphone inputs.

In operation 760, the processor 460 may detect a microphone control input. For example, the wireless audio device 502 may detect that the wearer's utterance is stopped in a state in which the internal microphone is unmuted. For another example, the wireless audio device 302 may detect a designated input (e.g., a long-touch input or a designated number of touch inputs) through the input circuit 430. In operation 765, the processor 460 may perform control to mute the internal microphone based on the wearer's cessation of an utterance or the designated input.

According to an embodiment, the processor 460 may distinguish a speech section in which the wearer's utterance occurs and a speech-free section in which the wearer's utterance does not occur, through the sensor circuit 440, and may perform control to unmute the internal microphone in the speech section and mute the internal microphone in the speech-free section.

In operation 770, the processor 460 may acquire a sound only from the external microphone and transmit, to the electronic device, a first audio signal generated based thereon.

While the electronic device performs the recoding operation, the processor 460 may control ON or OFF of a microphone depending on whether a speech of the wearer wearing the wireless audio device exists and transmit, to the electronic device, an audio signal generated based thereon.

Figure 8:
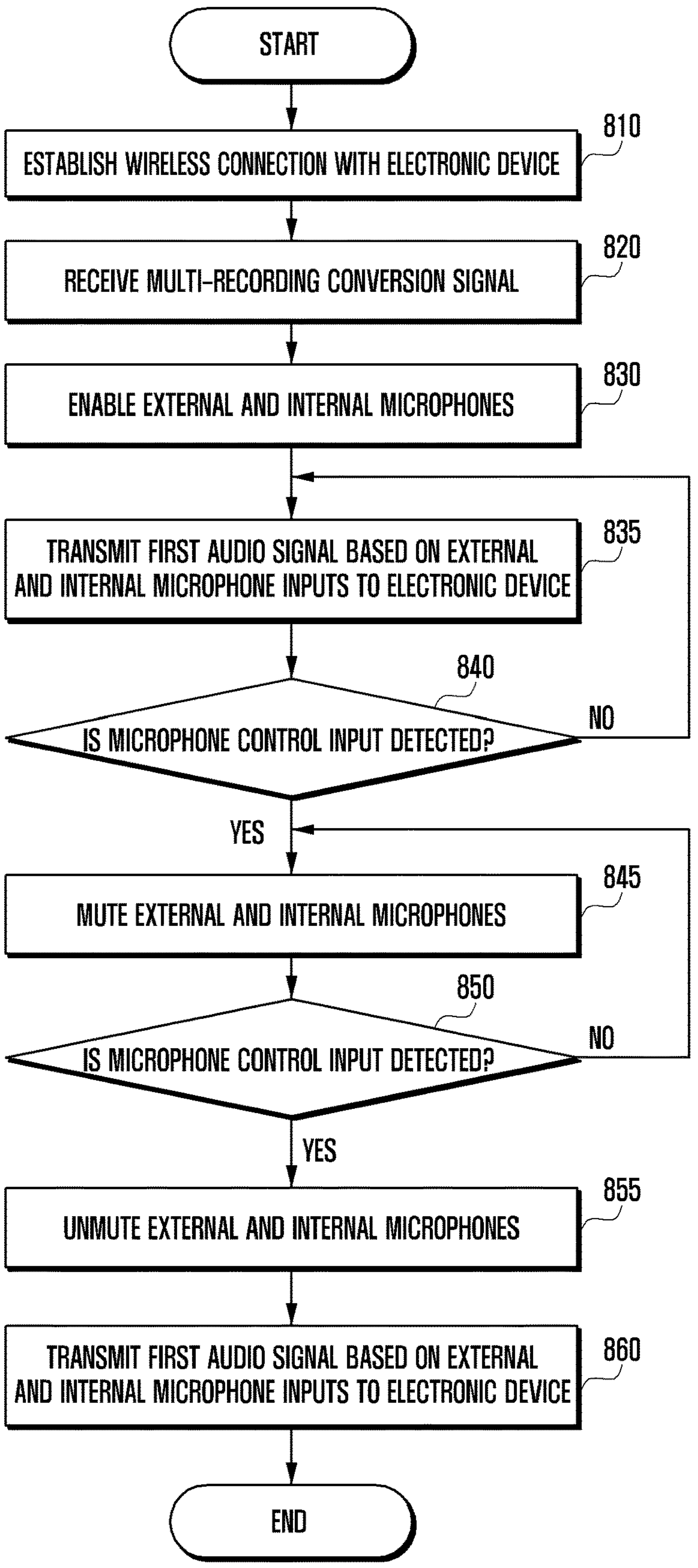
FIG. 8 illustrates a method for controlling a microphone input/output in a wireless audio device during multi-recording of an electronic device according to various embodiments.

FIG. 8 illustrates a method for controlling a microphone input/output in a wireless audio device during multi-recording of an electronic device according to various embodiments.

Referring to FIG. 8, according to an embodiment, in operation 810, a processor (e.g., the processor 460 in FIG. 4) of a wireless audio device (e.g., the wireless audio device 302 in FIG. 3 or the wireless audio device 502 in FIG. 5) may have wireless communication connection (e.g., pairing) with an electronic device (e.g., the electronic device 301 in FIG. 3 or the electronic device 501 in FIG. 5) through the wireless communication circuit 410. For example, communication link (or transmission link) based on Bluetooth communication (e.g., Bluetooth pairing) may be established between the electronic device 301 and the wireless audio device 302.

In operation 820, the processor 460 may receive a multi-recording conversion signal operating with the electronic device from the electronic device.

In operation 830, the processor 460 may enable external and internal microphones to wait for a microphone input based on the multi-recording conversion signal received from the electronic device 301. The processor 460 may acquire a sound through the external and internal microphones and generate a first audio signal based thereon.

According to an embodiment, the processor 460 may process an audio signal to include microphone position information to distinguish an external microphone signal and an internal microphone signal or include channel information including first channel information and second channel information.

In operation 835, the processor 460 may transmit, to the electronic device 301, a first audio signal generated based on the enabled external microphone and internal microphone inputs. The electronic device 301 may perform recording by combining an audio signal acquired from microphones of the electronic device 301 and the first audio signal transferred from the wireless audio device 302.

In operation 840, the processor 460 may detect a microphone control input in the multi-recording mode. For example, the wireless audio device 302 may detect an input designated as the microphone control input, for example, a long-touch input or a designated number of touch inputs through the input circuit 430.

In operation 845, the processor 460 may perform control to mute the internal microphone and the external microphone based on the microphone control input. The wireless audio device 302 may mute a sound acquired from the internal microphone and the external microphone. According to an embodiment, the processor 460 may inform the electronic device 301 that the internal microphone and the external microphone are muted based on the microphone control input. According to another embodiment, the wireless audio device 302 may inform the electronic device 301 that there is no signal input through the internal microphone and the external microphone.

While performing the multi-recording, the electronic device 301 may perform recording with only an audio signal acquired through microphones of the electronic device 301 without an audio signal transferred from the wireless audio device 302.

In operation 850, the processor 460 may detect a microphone control input. For example, the wireless audio device 302 may identify whether an input designated as the microphone control input, for example, a long-touch input or a designated number of touch inputs through the input circuit 430 is detected in a state in which the internal microphone and the external microphone are muted. For another example, the wireless audio device 302 may detect vibration through the sensor circuit 440 and detect whether a user's jaw is moving.

The processor 460 may perform operation 855 in case that an input designated for the microphone control input is input through the input circuit 430 and may perform operation 845 in case that an input designated for the microphone control input is not input.

In operation 855, the processor 460 may perform control to unmute the internal microphone and the external microphone. In operation 860, the processor 460 may transmit, to the electronic device 301, a first audio signal generated by acquiring a sound from the internal microphone and the external microphone again.

While the electronic device 301 performs the recording operation, a user may operate the wireless audio device 302 to perform control to mute or unmute a voice to be transmitted to the electronic device 301.

Figure 9:
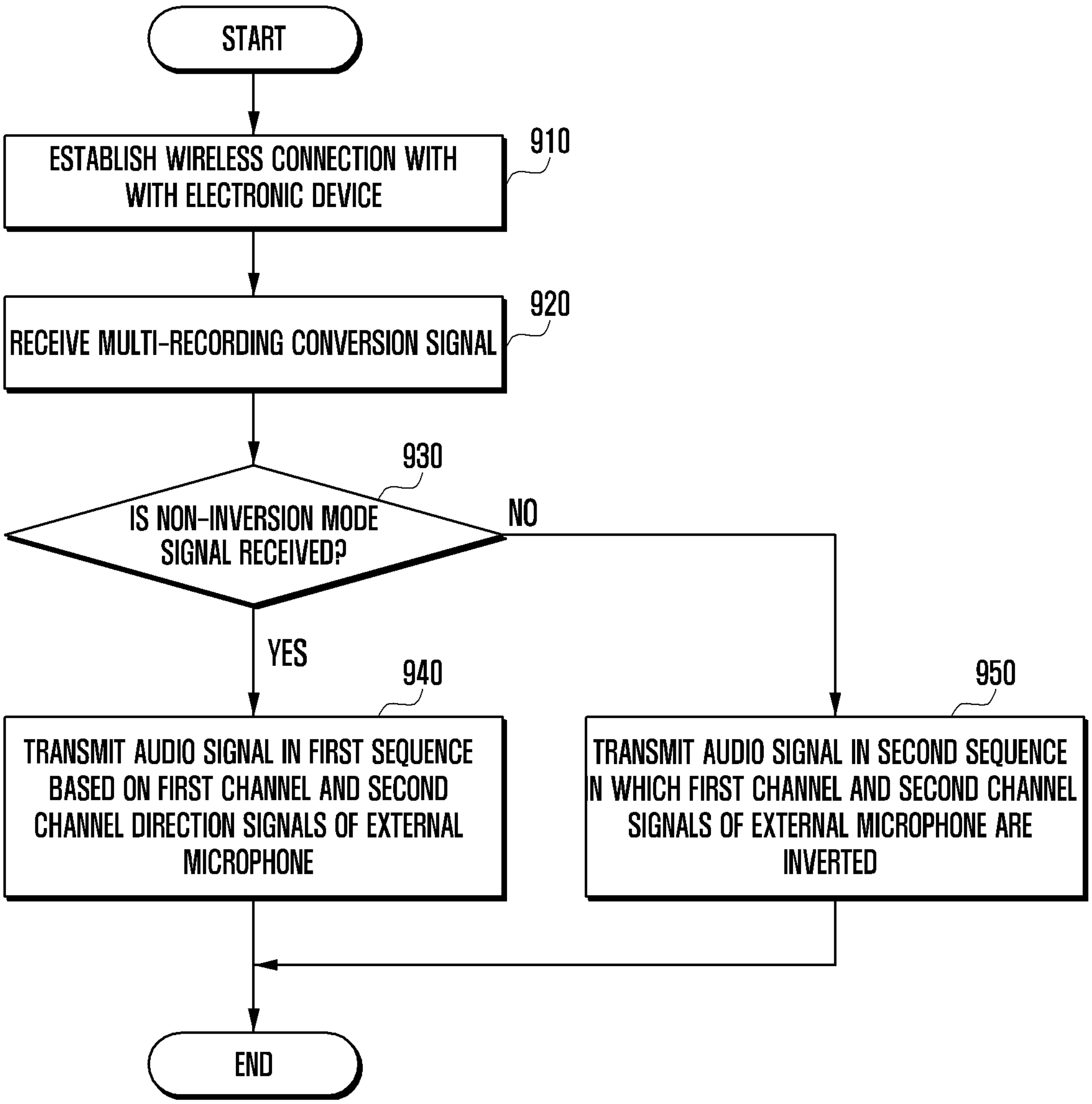
FIG. 9 illustrates a method for controlling a microphone input/output in a wireless audio device during multi-recording of an electronic device according to various embodiments.

FIG. 9 illustrates a method for controlling a microphone input/output in a wireless audio device during multi-recording of an electronic device according to various embodiments.

Referring to FIG. 9, according to an embodiment, in operation 910, a processor (e.g., the processor 460 in FIG.

4) of a wireless audio device (e.g., the wireless audio device 302 in FIG. 3 or the wireless audio device 502 in FIG. 5) may have wireless communication connection (e.g., pairing) with an electronic device (e.g., the electronic device 301 in FIG. 3 or the electronic device 501 in FIG. 5) through the wireless communication circuit 410. For example, communication link (or transmission link) based on Bluetooth communication (e.g., Bluetooth pairing) may be established between the electronic device 301 and the wireless audio device 302.

By way of example, the wireless audio device in FIG. 9 may be a device including a set of a first ear device (e.g., a first channel or a right channel) and a second ear device (e.g., a second channel or a left channel).

In operation 920, the processor 460 may receive a multi-recording conversion signal operating with the electronic device 301 from the electronic device 301.

In operation 930, the processor 460 may determine whether a non-inversion mode signal is received from the electronic device 301 during multi-recording.

According to an embodiment, the electronic device 301 paired with the wireless audio device 302 may support a non-inversion mode function in a camera configuration. The non-inversion mode may be a function that stores what is shown through the image sensor during selfie photographing. In case that a user input for selecting the non-inversion mode is detected, the electronic device 301 may not invert an image and record and store the same. The electronic device 301 may transmit a signal with respect to non-inversion mode execution to the wireless audio device 302.

In case of receiving the non-inversion mode, the processor 460 may proceed to operation 940 and transmit an audio signal in a first sequence based on first channel and second channel direction signals of the external microphone. In this case, the first channel direction may indicate the external microphone of the first ear device and the second channel direction may indicate the external microphone channel of the second ear device.

According to an embodiment, the wireless audio device 302 may transmit an audio signal in a packet form. The wireless audio device may distinguish packet time sections, transmit an audio signal in the first channel direction to the electronic device by using sections of first time slots, and transmit an audio signal in the second channel direction to the electronic device by using sections of second time slots. The electronic device may recognize an audio signal acquired from the first time slot sections as a first channel direction signal and an audio signal acquired from the second time slot sections as a second channel direction signal.

In case of not receiving the non-inversion mode, the processor 460 may proceed to operation 950 and transmit an audio signal in a second sequence in which first channel and second channel direction signals of the external microphone are inverted.

According to an embodiment, in case that the recording mode of the electronic device 301 is the non-inversion mode, the wireless audio device 302 may transmit an audio signal in the second channel direction by using the sections of first time slots and an audio signal in the first channel direction by using the sections of second time slots so as to be identified with a channel direction of an image acquired through a camera of the electronic device 301 and/or a sound acquired through a microphone of the electronic device 301. Accordingly, the electronic device 301 may perform recording of an image without inversion of image and voice channels when photographing in the non-inversion mode by using a camera.

According to some embodiments, the electronic device 301 may invert a first channel signal and a second channel signal received from the wireless audio device 302 in the non-inversion mode and store the same. For example, the electronic device 302 may store the first channel signal as a right channel and the second channel signal as a left channel, which are transferred from the wireless audio device 302, in case of photographing an image together with the wireless audio device 302, and then in case that the non-inversion mode is selected by the user, invert the first channel signal into the left channel and the second channel signal into the right channel, which are transferred from the wireless audio device 302 and store the same.

According to an embodiment, in case of operating in the multi-recording mode, the electronic device 301 may display a user interface (UI) related to an audio signal received from the wireless audio device 302. For example, the electronic device 301 may display information on whether an audio signal is received from the wireless audio device 302 and information (e.g., a direction or sound volume intensity) on the received audio signal. For another example, in a state in which an audio signal is not received from the wireless audio device 302 or at least one microphone of the wireless audio device 302 is muted, the electronic device 301 may display that an audio signal is not received from the wireless audio device 302. According to an embodiment, the electronic device 301 may start, in a state of being connected with the wireless audio device, image photographing by the user and operate in the recording mode based on a type of a camera used by the user. For example, in case that the user photographs an external object (e.g., a subject wearing the wireless audio device) through a rear surface, the multi-recording mode may be operated. In case of changing from shooting an external object through a rear camera to taking a selfie through a front camera, the electronic device 301 may transmit a microphone control signal (e.g., a microphone mute request of the wireless audio device) to the wireless audio device 302.

According to various embodiments, a method for controlling a microphone input/output in a wireless audio device (e.g., the wireless audio device 302 in FIG. 3) in case that an electronic device (e.g., the electronic device 101 in FIG. 1 or the electronic device 301 in FIG. 3) performs multi-recording may include an operation of receiving a multi-recording conversion signal from the electronic device in a state of having wireless communication connection with the electronic device, an operation of enabling at least one of an internal microphone and an external microphone mounted in the wireless audio device based on the multi-recording conversion signal, an operation of transmitting a first audio signal acquired through at least one of the enabled internal microphone and external microphone to the electronic device, an operation of detecting a microphone control input, an operation of selectively muting or unmuting at least one of the internal microphone and the external microphone based on the microphone control input, and an operation of transmitting, to the electronic device, a second audio signal generated based on a microphone input acquired in a state where at least one of the internal microphone and the external microphone is selectively muted or unmuted according to a condition of the microphone control input.

According to various embodiments, the operation of selectively muting or unmuting at least one of the internal microphone and the external microphone may further include an operation of muting the internal microphone in response to the microphone control input in a state in which the external microphone and the internal microphone are enabled based on the reception of the multi-recording conversion signal.

According to various embodiments, the operation of selectively muting or unmuting at least one of the internal microphone and the external microphone may further include an operation of unmuting the internal microphone in response to detection of the microphone control input in a state in which the internal microphone is muted.

According to various embodiments, the operation of selectively muting or unmuting at least one of the internal microphone and the external microphone may further include an operation of muting the external microphone and the internal microphone in response to the microphone control input in a state in which the external microphone and the internal microphone are enabled based on the reception of the multi-recording conversion signal.

According to various embodiments, the operation of selectively muting or unmuting at least one of the internal microphone and the external microphone may further include an operation of unmuting the external microphone and the internal microphone in response to detection of the microphone control input in a state in which the external microphone and the internal microphone are muted.

According to various embodiments, the microphone control input may include at least one of a touch input, a voice utterance input, and a sensor input.

According to various embodiments, the operation of selectively muting or unmuting at least one of the internal microphone and the external microphone may further include an operation of unmuting the internal microphone in case that the microphone input receives an utterance of the user and muting the internal microphone in case of not receiving an utterance of the user in a state in which the internal microphone is muted.

According to various embodiments, the operation of transmitting the first audio signal or the second audio signal to the electronic device may further include an operation of performing noise canceling based on a signal acquired from the external microphone and a signal acquired from the internal microphone and transmitting the noise-canceled signal to the electronic device.

According to various embodiments, the operation of transmitting the first audio signal or the second audio signal to the electronic device may further include an operation of transmitting the first audio signal or the second audio signal to the electronic device based on a first sequence for transmitting a first channel signal and a second channel signal in case that the multi-recording mode of the electronic device is a first mode and an operation of transmitting the audio signal to the electronic device based on a second sequence in which the first channel signal and the second channel signal are inverted in case that the multi-recording mode of the electronic device is a second mode.

According to various embodiments, the first mode may correspond to a mode for photographing an image through a rear camera of the electronic device and the second mode may correspond to a mode for photographing an image through a front camera of the electronic device.

According to various embodiments, in case that multi-recording (e.g., recording an audio or recording a video) is concurrently performed by using an electronic device and an audio device, a device for collecting an audio signal may be selected by controlling an input/output of a microphone in a wireless audio device.

According to various embodiments, in a multi-recording mode using the wireless audio device in the electronic device, a microphone control input is detected in the wireless audio device and enablement or disablement of at least one of utilized microphones is controlled so that an audio signal acquired from a microphone of the wireless audio device may be controlled to be transmitted or not to be transmitted to the electronic device.

According to various embodiments, the electronic device may collect an audio signal through the electronic device or the wireless audio device according to an image recording environment (e.g., an utterance of a subject, selfie photographing, or external sound recording) of a subject or photographer.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added.

Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A wireless audio device comprising:

a communication module;

a plurality of microphones comprising an internal microphone and an external microphone; and at least one processor configured to:

receive a multi-recording conversion signal from an electronic device through the communication module, enable at least one microphone of the internal microphone and the external microphone based on the multi-recording conversion signal, transmit a first audio signal generated based on a sound input through the enabled at least one microphone to the electronic device through the communication module, detect a microphone control input, selectively mute or unmute the at least one microphone based on the microphone control input, and transmit, to the electronic device through the communication module, a second audio signal generated based on a microphone input acquired in a state where the at least one microphone is selectively muted or unmuted based on the microphone control input.

2. The wireless audio device of claim 1, wherein the at least one processor is further configured to mute the internal microphone based on a first microphone control input.

3. The wireless audio device of claim 2, wherein the at least one processor is further configured to unmute the internal microphone based on a second microphone control input in a state in which the internal microphone is muted.

4. The wireless audio device of claim 2, wherein the at least one processor is further configured to mute the internal microphone and the external microphone based on the first microphone control input.

5. The wireless audio device of claim 4, wherein the at least one processor is further configured to unmute the internal microphone and the external microphone based on a second microphone control input in a state in which the internal microphone and the external microphone are muted.

6. The wireless audio device of claim 1, wherein the microphone control input comprises at least one of a touch input, a voice utterance input, and a sensor input.

7. The wireless audio device of claim 1, wherein the at least one processor is further configured to:

detect a voice utterance, enable the internal microphone in a voice utterance input section, and mute the internal microphone in a section in which the voice utterance does not occur.

8. The wireless audio device of claim 1, wherein the at least one processor is further configured to:

enable the external microphone and mute the internal microphone based on the multi-recording conversion signal, unmute the internal microphone based on a user voice utterance input, and mute the internal microphone based on the user voice utterance input not being received.

9. The wireless audio device of claim 1, wherein the at least one processor is further configured to:

perform noise canceling based on a signal acquired from the external microphone and a signal acquired from the internal microphone, and transmit, to the electronic device through the communication module, the first audio signal or the second audio signal from which noise is canceled.

10. The wireless audio device of claim 1, wherein the at least one processor is further configured to:

based on a multi-recording mode of the electronic device being a first mode, transmit the first audio signal or the second audio signal to the electronic device through the communication module based on a first sequence configured to transmit a first channel signal and a second channel signal, and based on the multi-recording mode of the electronic device being a second mode, transmit the first audio signal or the second audio signal to the electronic device through the communication module based on a second sequence in which the first channel signal and the second channel signal are inverted.

11. A method for controlling a microphone in a wireless audio device, the method comprising:

receiving a multi-recording conversion signal from an electronic device in a state that the wireless audio device establishes wireless communication connection with the electronic device;

enabling at least one microphone of an internal microphone and an external microphone mounted in the wireless audio device based on the multi-recording conversion signal;

transmitting a first audio signal acquired through the enabled at least one microphone to the electronic device;

detecting a microphone control input;

selectively muting or unmuting the at least one microphone based on the microphone control input; and transmitting, to the electronic device, a second audio signal generated based on a microphone input acquired in a state where the at least one microphone is selectively muted or unmuted based on the microphone control input.

12. The method of claim 11, wherein the selectively muting or unmuting of the at least one microphone further comprises muting the internal microphone based on the microphone control input in a state in which the external microphone and the internal microphone are enabled based on the receiving of the multi-recording conversion signal.

13. The method of claim 12, wherein the selectively muting or unmuting of the at least one microphone of the internal microphone and the external microphone comprises unmuting the internal microphone based on the detecting of the microphone control input in a state in which the internal microphone is muted.

14. The method of claim 11, wherein the selectively muting or unmuting of the at least one microphone of the internal microphone and the external microphone comprises muting the external microphone and the internal microphone based on the microphone control input in a state in which the external microphone and the internal microphone are enabled based on the reception of the multi-recording conversion signal.

15. The method of claim 14, wherein the selectively muting or unmuting of the at least one microphone of the internal microphone and the external microphone further unmuting the external microphone and the internal microphone based on the detecting of the microphone control input in a state in which the external microphone and the internal microphone are muted.

16. The method of claim 11, wherein the selectively muting or unmuting of the at least one microphone of the internal microphone and the external microphone comprises:

detecting a voice utterance;

enabling the internal microphone in a voice utterance input section; and muting the internal microphone in a section in which the voice utterance does not occur.

17. The method of claim 11, wherein the selectively muting or unmuting of the at least one microphone of the internal microphone and the external microphone comprises:

enabling the external microphone and muting the internal microphone based on the multi-recording conversion signal;

unmuting the internal microphone based on a user voice utterance input; and muting the internal microphone based on the user voice utterance input not being received.

18. The method of claim 11, further comprising performing noise canceling based on a signal acquired from the external microphone and a signal acquired from the internal microphone.

19. The method of claim 11, wherein based on a multi-recording mode of the electronic device being a first mode, the first audio signal and the second audio signal are transmitted to the electronic device in a first sequence configured to transmit a first channel signal and a second channel signal, and wherein based on the multi-recording mode of the electronic device being a second mode, the first audio signal and the second audio signal are transmitted to the electronic device based on a second sequence in which the first channel signal and the second channel signal are inverted.

20. A non-transitory computer-readable recording medium having recorded thereon a program that is executed by a processor to perform the method of claim 11.

* * * * *